April 25, 1944.  W. PHILLIPS  2,347,609
ARTIFICIAL BAIT
Filed Oct. 22, 1942
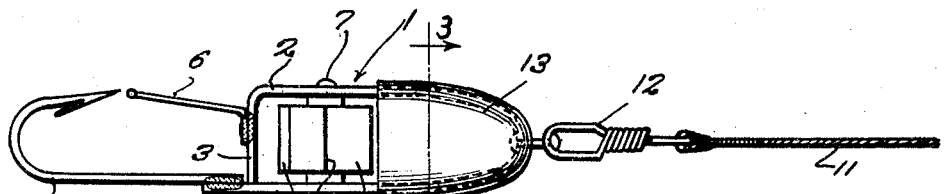
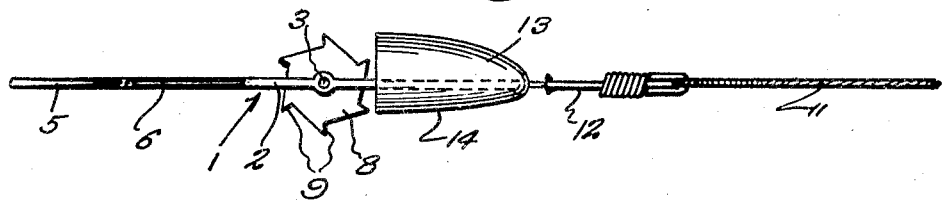
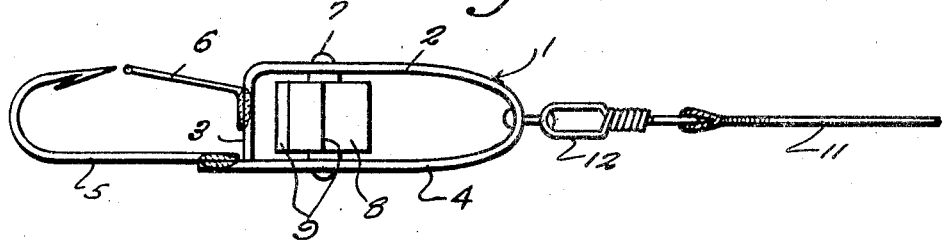
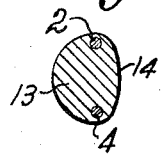
Walter Phillips
By Clarence A. O'Brien
and Harvey B. Jacobson
Attorneys Patented Apr. 25, 1944

2,347,609

UNITED STATES PATENT OFFICE 2,347,609

ARTIFICIAL BAIT

Walter Phillips, Niagara Falls, N. Y.

Application October 22, 1942, Serial No. 462,973

2 Claims. (Cl. 43—42)

The present invention relates to new and useful improvements in artificial fish bait, and has for its primary object to provide, in a manner as hereinafter set forth, a device of this character comprising water actuated means of a novel construction and arrangement for attracting and luring the fish.

Other objects of the invention are to provide an artificial bait of the aforementioned character which will be comparatively simple in construction, strong, durable, highly efficient and reliable in use, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of an artificial bait constructed in accordance with the present invention.

Figure 2 is a plan view thereof.

Figure 3 is a cross-sectional view, taken substantially on the line 3—3 of Figure 1.

Figure 4 is a view in side elevation of an embodiment wherein the shield for the spinner is omitted.

Referring now to the drawing in detail, it will be seen that reference character 1 designates generally a substantially U-shaped metallic frame. The leg 2 of the frame 1 terminates in a transversely bent end portion 3 which is fixed in any suitable manner to the leg 4 at a point in spaced relation to the free end of the latter.

Mounted on the projecting free end portion of the leg 4 of the frame 1 is a longitudinally extending hook 5. A resilient guard 6 for the hook 5 is fixed on the portion 3 of the frame 1.

Extending between the legs 2 and 4 of the frame 1 at an intermediate point is a shaft 7. A spinner 8 is mounted on the shaft 7 for rotation in the frame 1. The spinner 8 is in the form of a water wheel, said spinner comprising transverse, one-way fins 9 on its periphery.

A leader 11 is connetced to the bight portion of the frame 1 through the medium of a swivel 12.

In the embodiment of Figures 1 and 2 of the drawing, a shield 13 is provided on the front portion of the frame 1 for the spinner 8. The shield 13 comprises a substantially streamlined body of suitable material which is molded on the front portion of the frame 1. As best seen in Figure 2 of the drawing, the shield 13 includes a comparatively straight, flat longitudinal side 14 which exposes the adjacent peripheral portion of the spinner 8 to the action of the water as the device is drawn therethrough.

It is thought that the operation of the bait will be readily apparent from a consideration of the foregoing. Briefly, as the device is drawn through the water in the usual manner, said water impinges the faces of the fins 9 and causes the spinner 8 to rotate rapidly for attracting and luring the fish. The shield 13 also assists in luring the fish, said shield being suitably finished or ornamented for this purpose. Of course, when the fish strikes, it is caught by the hook 5. The form of the invention shown in Figure 4 of the drawing is for use in free, clear water. The embodiment illustrated in Figures 1 and 2, comprising the shield 13 for the spinner 8, is for use in water where fouling is likely to occur.

It is believed that the many advantages of an artificial fish bait constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

1. An artificial fish bait comprising a substantially U-shaped frame, one of the legs of the frame including a transverse end portion engaged with the other leg of said frame at a point in spaced relation to the free end of said other leg, a longitudinally extending hook fixed on said free end portion of said other leg of the frame, a guard for the hook fixed on the transversely extending end portion of said one leg of the frame, a shaft extending between the legs of the frame at an intermediate point, and a spinner on the shaft rotatable in the frame.

2. An artificial fish bait comprising a substantially U-shaped metallic frame, a spinner rotatably mounted in the frame, said spinner comprising a water wheel including transverse propulsion ribs on its periphery, a shield comprising an elongated body molded on the frame forwardly of the spinner, said shield including a substantially straight side portion, the spinner projecting beyond said straight side portion of the shield, and a hook mounted on the frame rearwardly of the spinner.

WALTER PHILLIPS.